United States Patent
Baumgarte et al.

(10) Patent No.: US 8,029,270 B2
(45) Date of Patent: Oct. 4, 2011

(54) METHOD AND DEVICE FOR BLOW-MOLDING CONTAINERS

(75) Inventors: Rolf Baumgarte, Ahrenburg (DE); Michael Litzenberg, Geesthacht (DE); Michael Linke, Ahrensburg (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 207 days.

(21) Appl. No.: 11/918,707

(22) PCT Filed: Mar. 30, 2006

(86) PCT No.: PCT/DE2006/000591
§ 371 (c)(1),
(2), (4) Date: Oct. 16, 2007

(87) PCT Pub. No.: WO2006/111127
PCT Pub. Date: Oct. 26, 2006

(65) Prior Publication Data
US 2009/0065980 A1    Mar. 12, 2009

(30) Foreign Application Priority Data
Apr. 16, 2005  (DE) .................. 10 2005 017 540

(51) Int. Cl.
*B29C 49/00*  (2006.01)
(52) U.S. Cl. ........ 425/540; 425/541; 425/451; 425/150; 425/592; 425/593; 425/451.5; 425/451.6
(58) Field of Classification Search .............. 264/503, 264/523, 524, 572; 425/526, 522, 542, 540, 425/541, 451, 150, 592, 593, 451.5, 451.6
See application file for complete search history.

(56) References Cited

U.S. PATENT DOCUMENTS

| | | | | |
|---|---|---|---|---|
| 3,005,235 | A * | 10/1961 | Patera | 425/156 |
| 5,346,386 | A * | 9/1994 | Albrecht et al. | 425/541 |
| 6,457,967 | B1 * | 10/2002 | Suzuki et al. | 425/526 |
| 6,749,419 | B2 * | 6/2004 | Nightingale et al. | 425/532 |
| 2003/0232105 | A1 * | 12/2003 | Nightingale et al. | 425/540 |

FOREIGN PATENT DOCUMENTS
DE        23 52 926        4/1975
(Continued)

*Primary Examiner* — Christina Johnson
*Assistant Examiner* — Saeed Huda
(74) *Attorney, Agent, or Firm* — Lucas & Mercanti, LLP; Klaus P. Stoffel (57) ABSTRACT

The invention relates to a method and a device for blow-moulding containers from preforms which have been previously heated in a heating section and consist of a thermoplastic material. After being heated, said preforms are transferred to a blowing device in which they are deformed in order to form containers under the action of a blowing pressure inside blow moulds. The blow moulds respectively consist of at least two blow-moulding segments. The preforms are transported together with the blow moulds at least along part of a path of a rotating blow wheel. The blow-moulding segments are braced in relation to each other during at least part of the blow-moulding process. At least one of the blow-moulding segments is pivoted about a rotational axis in order to perform opening and closing movements. Once a blowing station holding the blow-moulding segments is closed, at least one of the blow-moulding segments is then supported, at a distance from the rotational axis and independently from the other blow-moulding segment, in relation to a counter-bearing connected to the blow wheel. The supported blow-moulding segment is at least partially braced in relation to both the counter-bearing and the other blow-moulding segment.

13 Claims, 11 Drawing Sheets

| | FOREIGN PATENT DOCUMENTS | | JP | 61086235 | 5/1986 |
|---|---|---|---|---|---|
| DE | 42 12 583 | 10/1993 | WO | 99/62692 | 12/1999 |
| DE | 43 40 291 | 6/1995 | WO | 03/106141 | 12/2003 |
| DE | 102004057102 | 6/2006 | | | |

* cited by examiner

METHOD AND DEVICE FOR BLOW-MOLDING CONTAINERS

The invention concerns a method for blow molding containers, in which preforms made of a thermoplastic material are heated in a heating line and then transferred to a blowing system, in which the preforms are shaped into containers by the action of blowing pressure inside blow molds, which consist of at least two blow mold segments; in which the preforms are conveyed together with the blow molds along at least part of a peripheral path of a rotating blowing wheel; in which the blow mold segments are braced relative to each other during at least part of the blow-molding process; and in which at least one of the blow mold segments is rotated about a hinge pin to carry out opening and closing movements.

The invention also concerns a device for blow molding containers, which has a heating line for heating preforms made of a thermoplastic material and a blowing system, which has at least one blowing station arranged on a blowing wheel for shaping the preforms into containers, in which blowing system the blowing station is provided with mold supports for supporting each blow mold segment, and in which blowing system a first mold support is mounted in such a way that it can move relative to a second mold support by rotating about a hinge pin.

In container molding of this type by the action of blowing pressure, preforms made of a thermoplastic material, for example, preforms made of PET polyethylene terephthalate, are fed to different treatment stations within a blow-molding machine. A blow-molding machine of this type typically has a heating system and a blowing system, in which the preform, which has first been brought to a desired temperature, is expanded into a container by biaxial orientation. The expansion is effected by means of compressed air, which is fed into the preform to be expanded. DE-OS 43 40 291 explains the process-engineering sequence in this type of expansion of the preform.

The basic design of a blowing station for container molding is described in DE-OS 42 12 583. Possible means of bringing the preform to the desired temperature are illustrated in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs include the use of gripping tongs for handling the preforms and the use of expanding mandrels, which can be inserted in the mouth section of the preform to support the preform.

The above-explained handling of the preform occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

As a result of steadily increasing demands on the productivity of blow-molding machines, blowing wheels are used which rotate relatively fast and have a relatively large number of blowing stations.

The large number of blowing stations results in blowing wheels with large diameters, and the high speeds of rotation result in large braking and accelerating forces due to the high kinetic energy of the moving masses.

To diminish these negative effects, it has already been proposed that the blowing wheels be designed with a compact arrangement of blowing stations. DE-OS 199 48 474 describes a large number of design variations. However, so far no design has been found that allows improved compactness of the blowing wheel and at the same time allows a simple basic mechanical design.

The objective of the present invention is to improve a method of the aforementioned type in a way that helps to optimize the kinematic sequences of the blow-molding machine.

In accordance with the invention, the solution to this problem is characterized by the fact that after a blowing station, in which the blow mold segments are mounted, has been closed, at least one of the blow mold segments is supported, at a distance from the hinge pin and independently of the other blow mold segment, relative to an end support that is rigidly connected with the blowing wheel and is at least temporarily braced relative to both the end support and the other blow mold segment.

A further objective of the present invention is to design a device of the aforementioned type in such a way that a compact and inexpensive design of the blowing wheel is produced with improved distribution of the rotating masses.

In accordance with the invention, the solution to this problem is characterized by the fact that, when the blowing station is in a closed position, at least one of the mold supports, independently of the other mold support and at a distance from a hinge pin of the blowing station, is arranged in such a way that it is supported relative to an end support that is rigidly connected with the blowing wheel, and that the mold support that is supported relative to the end support is positioned in such a way that it can be braced at least temporarily both relative to the end support and relative to the other mold support.

In accordance with a special independent variant of the invention, it is also provided that the second mold support is rigidly connected with the blowing wheel.

Due to the fact that one of the mold supports or one of the blow mold segments is supported, independently of the other blow mold segment, relative to an end support that is rigidly connected with the blowing wheel, it is possible to dispense with a conventional locking mechanism, with which a closed force path is produced within the blowing station.

During the blow molding of the preforms into containers, considerable forces occur within the blowing station due to the pressure acting there. The blow mold segments, which are typically arranged to rotate relative to each other, are pushed apart by these forces. In accordance with a conventional design of the blowing stations, to prevent the blow mold segments from being pushed apart, the force is absorbed on one side in the vicinity of the swivel bearing and on the opposite side in the vicinity of the locking mechanism. To this end, the mold supports must have a relatively stable construction to absorb the forces that occur. In addition, the locking mechanism that is necessary has corresponding economic costs, and the locking elements are located very far to the outside on the rotating blowing wheel, so that the mechanical inertia of the blowing wheel is adversely affected by the corresponding mass distribution.

In accordance with the invention, it was recognized that support of at least one of the mold supports or of at least one of the blow mold segments relative to an end support that is rigidly connected with the blowing wheel, combined with the ability to be braced, is perfectly sufficient for preventing undesired partial opening of the blowing station by the blowing pressure acting therein. The support of the mold supports or blow mold segment and their ability to be braced independently of the other mold support of the blowing station or of the other blow mold segment results in additional important advantages with respect to the required mechanical stability and the weight of the components that are used.

A common support of the mold supports or of the blow mold segments by common fork-shaped outer frame parts, as described, for example, in the patents EP 1 216 136 and DE 100 27 111, is made unnecessary by the support and bracing ability proposed by the present invention. Therefore, compared to these prior-art designs, it is possible to realize a considerably more compact arrangement of the blowing stations alongside one another and a significantly reduced structural weight. In accordance with the invention, the parts used in accordance with the prior art for the transmission of force, which are subject to strong bending forces, are avoided and are replaced by the direct introduction of force into the end support that is rigidly connected with the blowing wheel.

It is conducive to simple controllability if the bracing of the blow mold segments relative to each other is produced by pneumatic bracing.

To help realize simple kinematics while carrying out the feeding of the preforms and the removal of the containers, it is proposed that the blowing station be arranged in such a way with a parting plane of the blow mold segments that the parting plane is positioned obliquely to a radial reference plane of the blowing wheel.

In particular, it is found to be effective with respect to material handling if the mold support that is rigidly connected with the blowing wheel is arranged obliquely to the radial reference plane.

It is contemplated that an angle of inclination between the parting plane and the radial reference plane has a value in the range of 1° to 20°.

In a preferred embodiment, the hinge pin is arranged essentially vertically.

A favorable distribution of material on the blowing wheel can be realized if a supporting device for supporting the movable mold support relative to the end support is designed as part of a toggle joint.

A mechanically very simple design is realized if a supporting device for supporting the movable mold support relative to the end support has a wedge-shaped design.

Increased degrees of design freedom can be realized if the end support is designed as an independent part.

It is conducive to a compact design if the end support is designed as part of a blowing station adjacent to the blowing station to be supported.

It is also conducive to simple revolution of the material if the blowing station is designed for holding preforms with their mouth sections oriented vertically upward.

However, it is also possible for the blowing station to be designed to hold preforms with their mouth sections oriented vertically downward.

A high degree of modularity of the overall design can be realized if mold supports that are rigidly connected with the blowing wheel and mold supports that can move relative to the blowing wheel are alternately positioned along the outer periphery of the blowing wheel.

Still greater compactness is realized if pairs of mold supports that are rigidly connected with the blowing wheel in adjacent blowing stations and pairs of mold supports that are supported in such a way that they can rotate relative to the blowing wheel in adjacent blowing stations are arranged along the outer periphery of the blowing wheel.

An especially close arrangement of the blowing stations along the outer periphery of the blowing wheel can be realized if at least two adjacent blowing stations have a common mold support that is rigidly connected with the blowing wheel.

Specific embodiments of the invention are schematically illustrated in the drawings.

Figure 1:
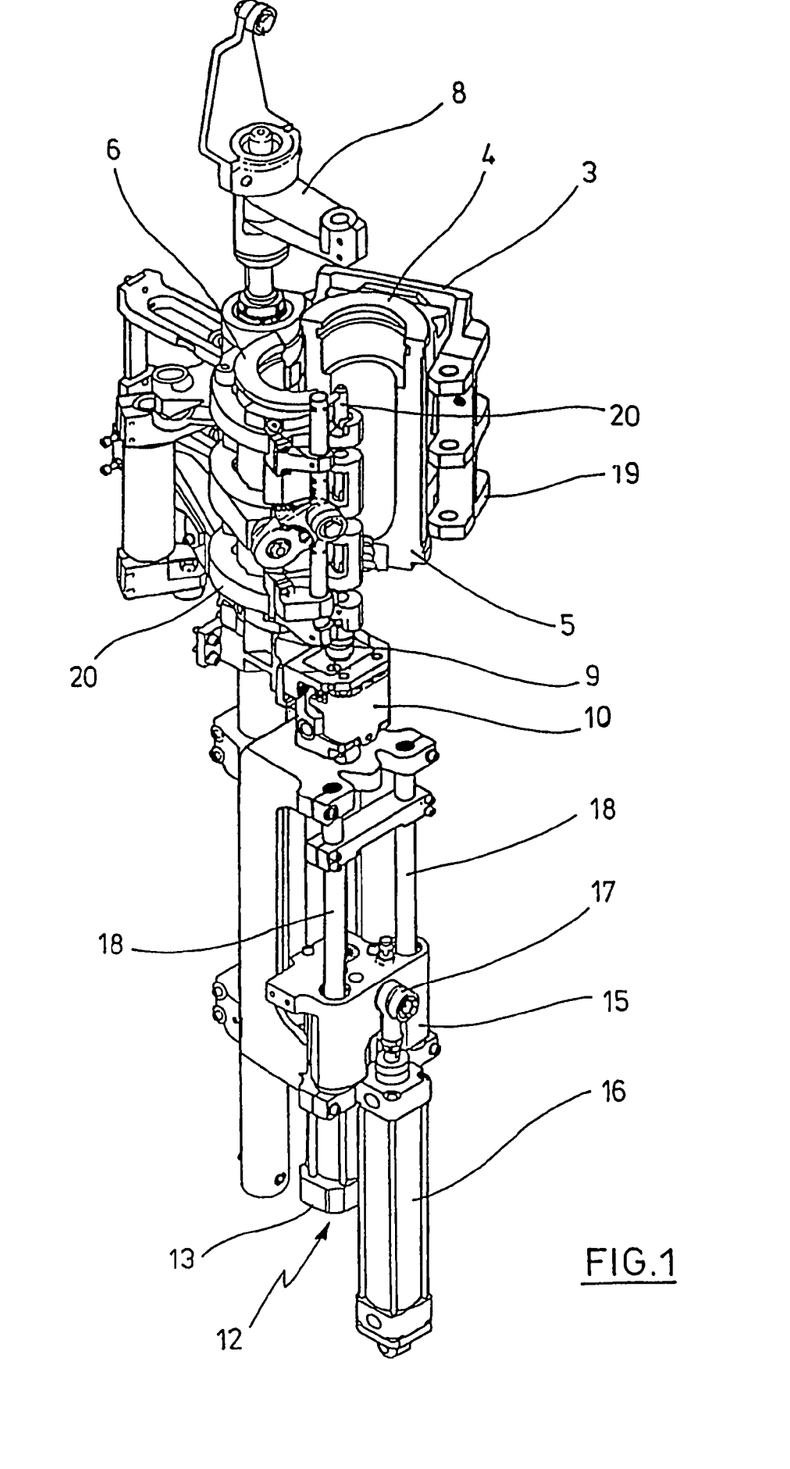
FIG. 1 shows a perspective view of a blowing station for producing containers from preforms.
Figure 2:
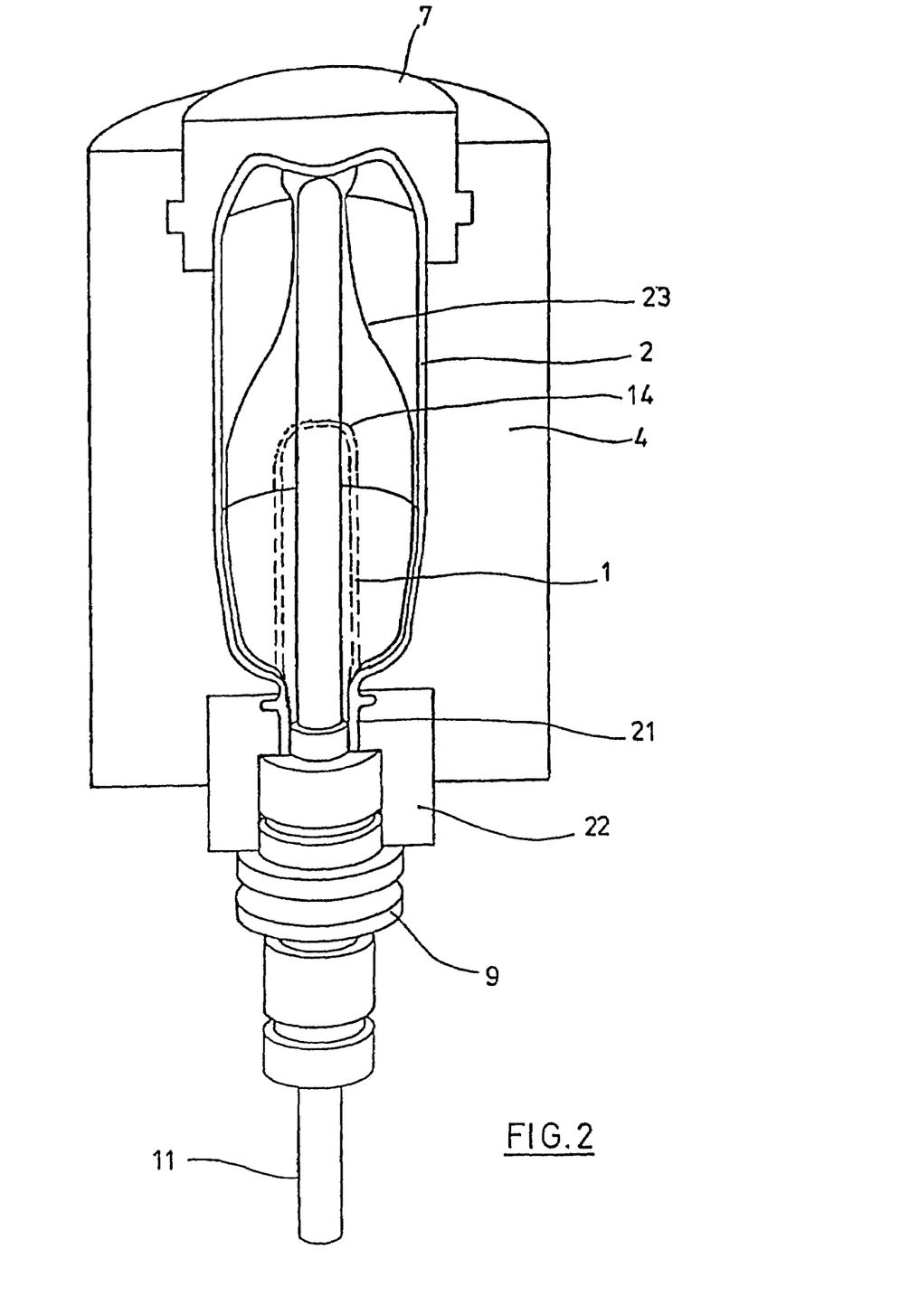
FIG. 2 shows a longitudinal section through a blow mold, in which a preform is stretched and expanded.

FIGS. 1 and 2 show the basic design of a device for shaping preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in place in the area of the blowing station 3 by a transport mandrel 9, which, together with the preform 1, passes through a large number of treatment stations within the device. However, it is also possible to insert the preform 1 directly into the blow mold 4, for example, with tongs or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

The preform 1 is stretched by means of a stretch rod 11, which is positioned by a cylinder 12. In principle, however, it is also possible to position the stretch rod 11 mechanically by means of curved segments, which are acted upon by pickup rollers. The use of curved segments is advantageous especially when a large number of blowing stations 3 is arranged on a rotating blowing wheel. The use of cylinders 12 is advantageous when stationary blowing stations 3 are provided.

In the embodiment illustrated in FIG. 1, the stretching system is designed in such a way that a tandem arrangement of two cylinders 12 is provided. Before the start of the actual stretching operation, the stretching rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by means of cam control. In particular, it is proposed that the secondary cylinder 16 be used in such a way under cam control that a current stretching position is predetermined by a guide roller 17, which slides along a curved track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking device 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
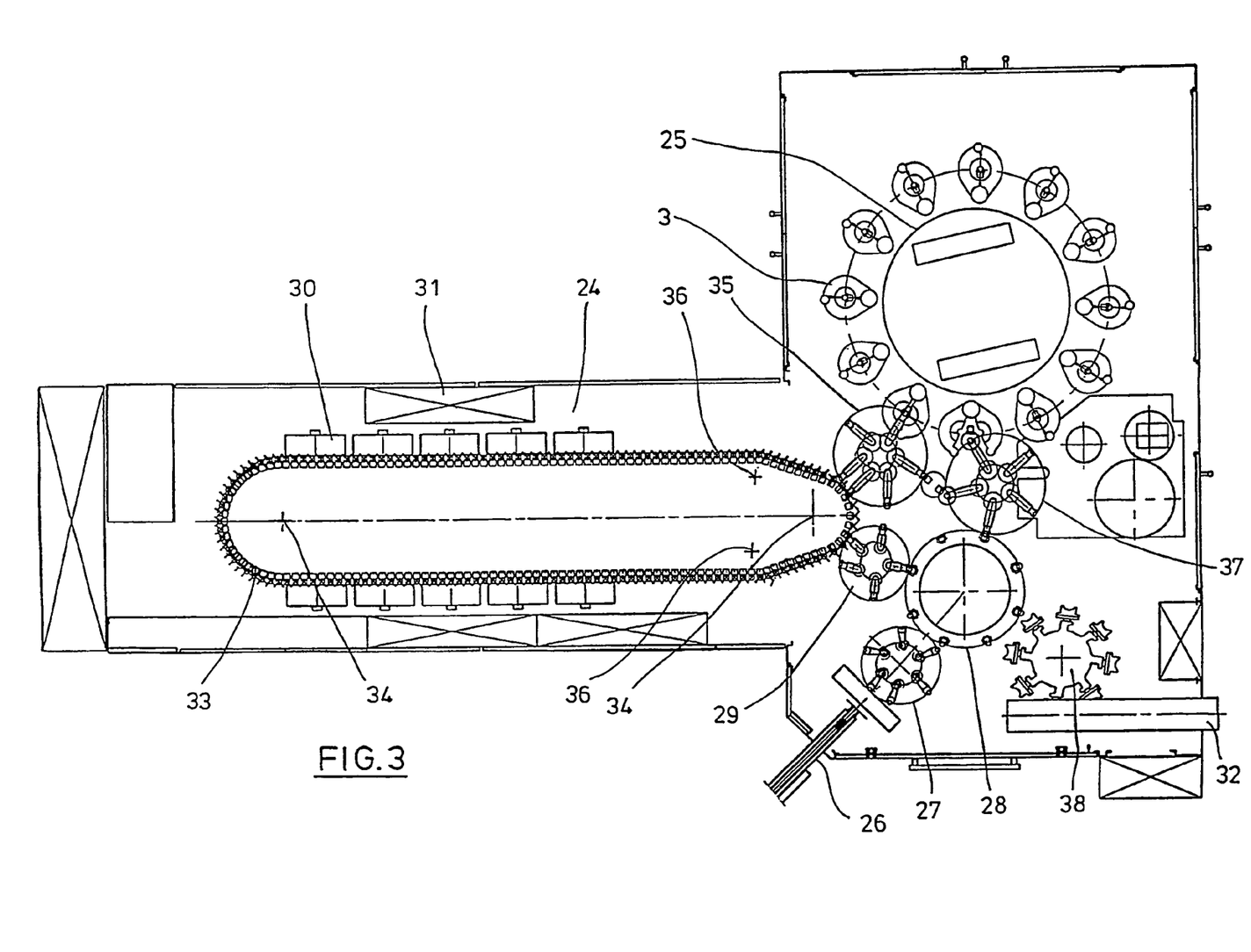
FIG. 3 shows a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be blow molded into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that, in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 29 and transfer to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
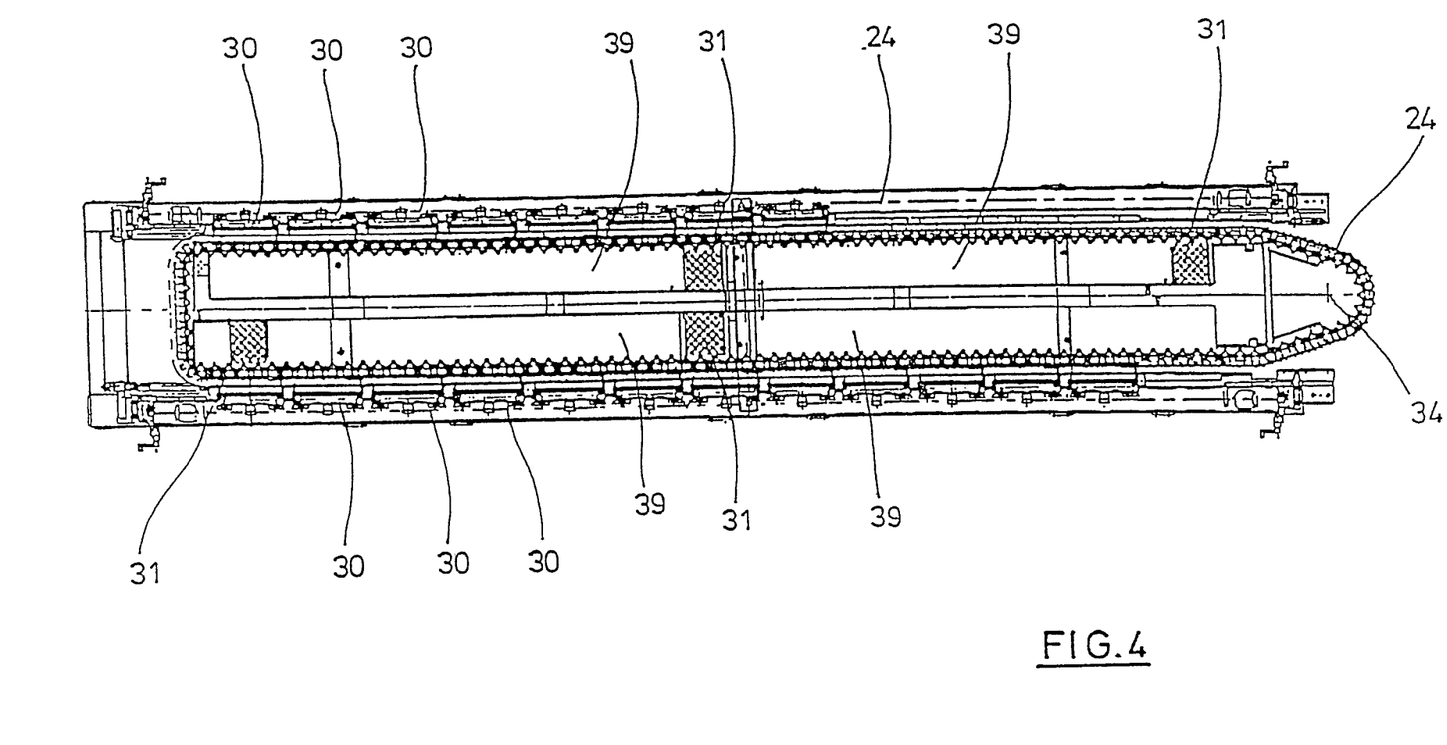
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
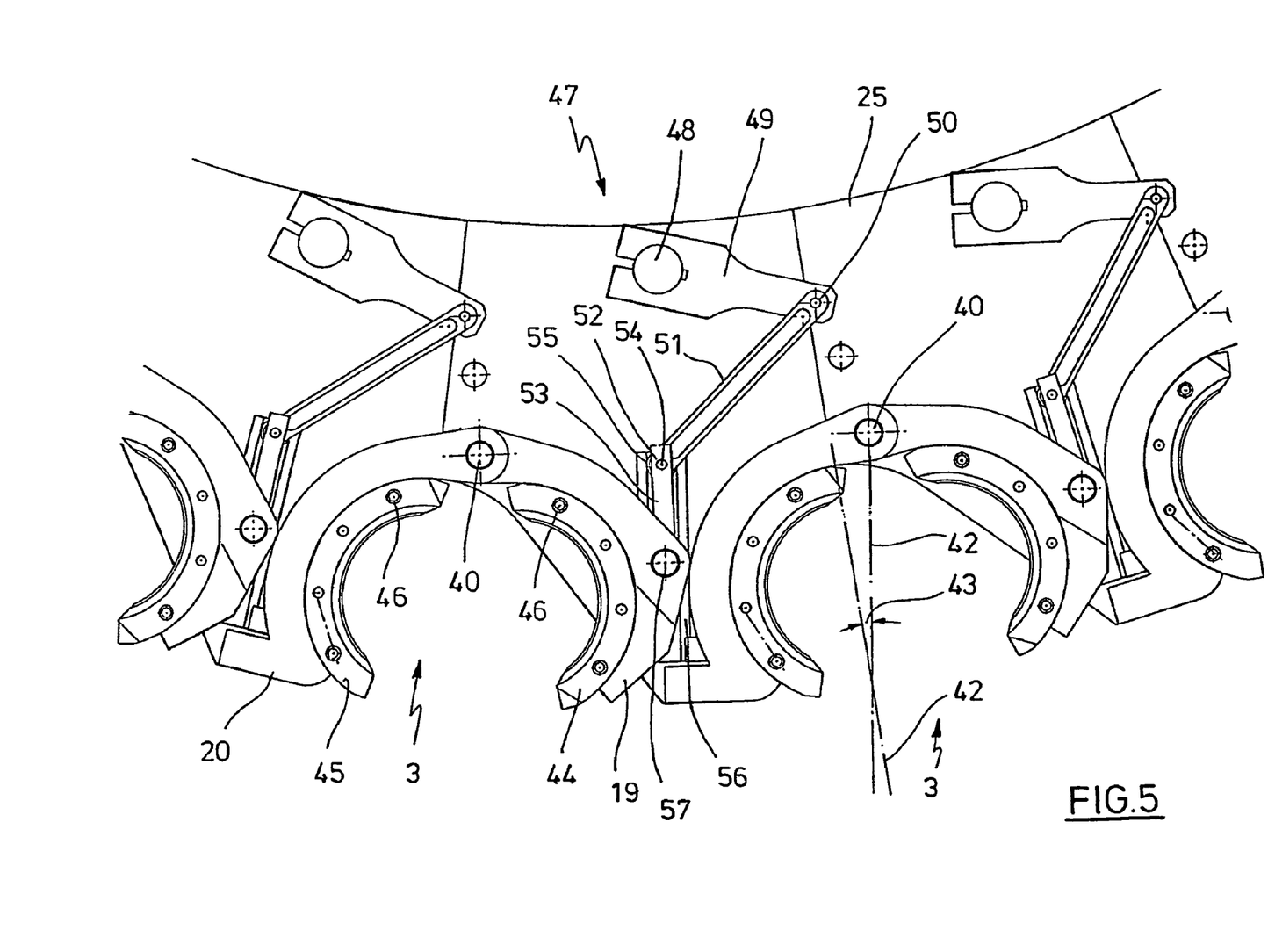
FIG. 5 shows a partial top view of a blowing wheel with several blowing stations arranged side by side in a completely opened state.

In the embodiment illustrated in FIG. 5, a plurality of blowing stations 3 is arranged along the circumference of the blowing wheel 25. The mold supports 19 are mounted in such a way that they can rotate about a hinge pin 40, and the mold supports 20 are rigidly connected with the blowing wheel 25. A parting plane 41 of the blowing station 3 is inclined relative to a radial reference plane 42 of the blowing wheel 25 by an angle of inclination 43.

In accordance with the design in FIG. 5, the blow molds consist of outer mold shells 44, 45 and inner mold shells not shown in FIG. 5, which have the contour of the container 2 that is to be produced. The outer mold shells 44, 45 have channels 46 for a medium for heating or cooling the blow mold 4, depending on the given application.

In the operating state of the blowing station 3 that is shown in FIG. 5, in which the blowing station 3 is opened to the maximum extent, the mold supports 19 of one blowing station 3 abut the mold supports 20 of the adjacent blowing station 3 or they are positioned only a very small distance from the adjacent mold supports. A positioning movement of the rotatable mold supports 19 is carried out by means of a positioning mechanism 47, which is preferably actuated under cam control. A cam control mechanism not shown in FIG. 5 is connected by a control shaft 48 with an articulated link 49, which is coupled by a swivel joint 50 with a control lever 51. The control lever 51 is connected by a swivel joint 52 with a support lever 53. A hinge pin 54 of the swivel joint 52 is mounted in such a way that its position can be varied along a guideway 56 by means of a control roller 55. The longitudinal axis of the guideway 56 extends essentially radially with respect to the axis of rotation of the blowing wheel 25.

Figure 6:
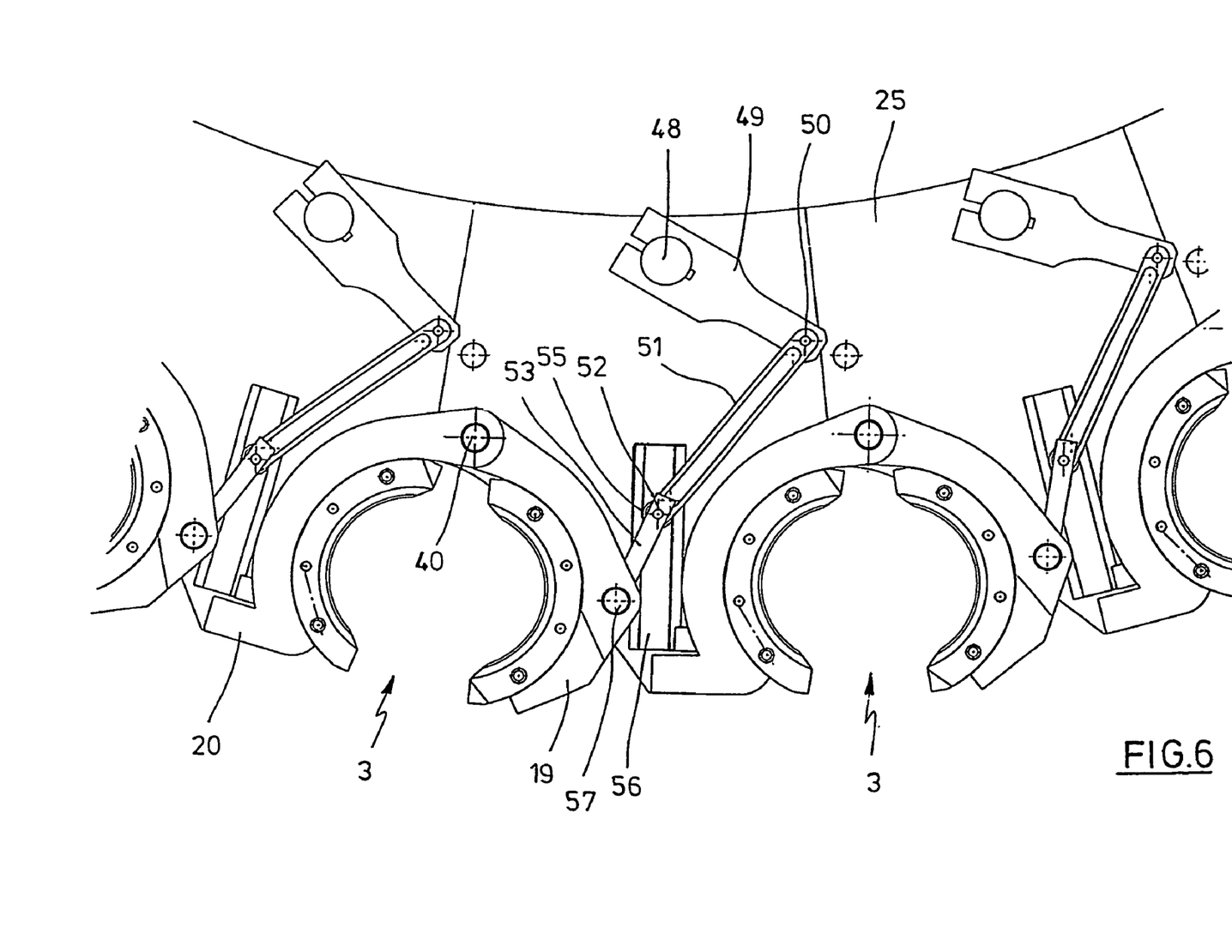
FIG. 6 shows the arrangement according to FIG. 5 after the blowing stations have been partially closed.

In the operating state shown in FIG. 6, the blowing stations 3 are partially closed compared to the operating state shown in FIG. 5 but are still partially open. This partially closed state was brought about by rotating the control shaft 48, thereby changing the positions of the levers 49, 51, 53. Due to the rotational movement of the articulated link 49, the control roller 55 was moved along the guideway 56 outwardly with respect to the circumference of the blowing wheel 25.

Figure 7:
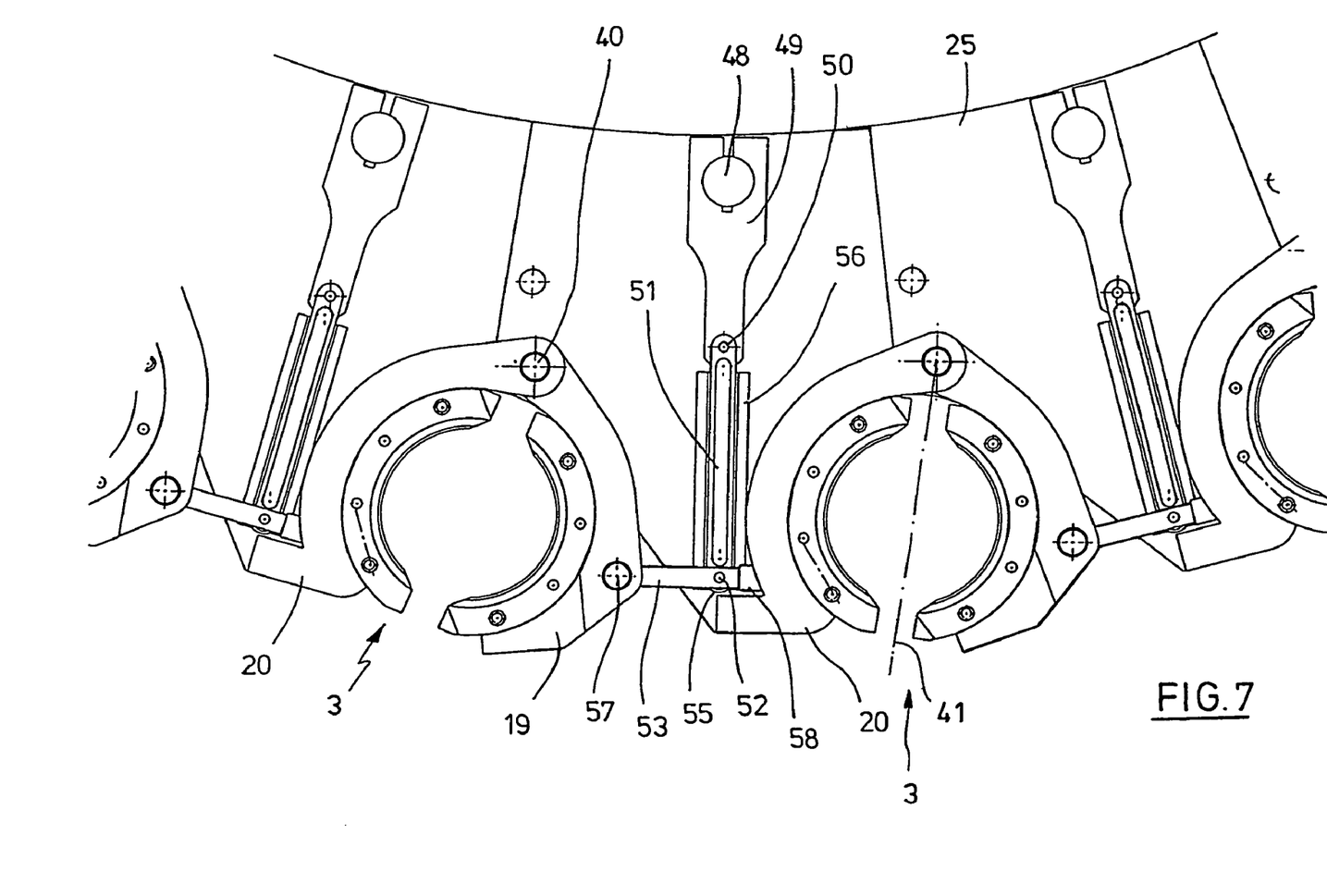
FIG. 7 shows the arrangement according to FIG. 5 and FIG. 6 after the blowing stations have been completely closed.

In the operating state shown in FIG. 7, the blowing stations 3 are completely closed. The remaining separation between the outer mold shells 44, 45 that is still seen in FIG. 7 is due to the fact that the inner mold shells are not shown in FIG. 7 either. The inner shells abut directly on the parting plane 41.

In the closed position of the blowing station 3, the articulated link 49 and the control lever 51 extend straightly aligned in the radial direction of the blowing wheel 25. In this position, the axis of rotation (not shown) of the blowing wheel 25, the control shaft 48, the swivel joint 50, and the swivel joint 52 are all essentially located on a radially oriented straight line. The support lever 53 is connected by a swivel joint 57 with the mold support 19. The opposite end of the support lever 53 from the swivel joint 57 is moved against and supported by an end support 58. The swivel joint 57, the swivel joint 52, and the end support 58 are arranged along a common straight line, which is positioned essentially at right angles to the radial direction of the blowing wheel 25.

The end support 58 can be designed either as a separate part that is rigidly connected with the blowing wheel 25 or as an integral part of the mold support 20. When the blowing station 3 is acted upon by internal pressure during the performance of a blow-molding operation, the force transmitted by the support lever 53 is passed virtually completely into the end support 58 and does not result in the application of force to the articulated link 49 and the control lever 51. In particular, in the positioning of the levers 49, 51, 53 shown in FIG. 7, it is possible, without additional application of force to the control shaft 48, to undertake bracing of the mold supports 19, 20 of a given blowing station 3 or of the associated blow mold segments relative to each other. Accordingly, no additional locking of the blowing stations 3 is needed.

Figure 8:
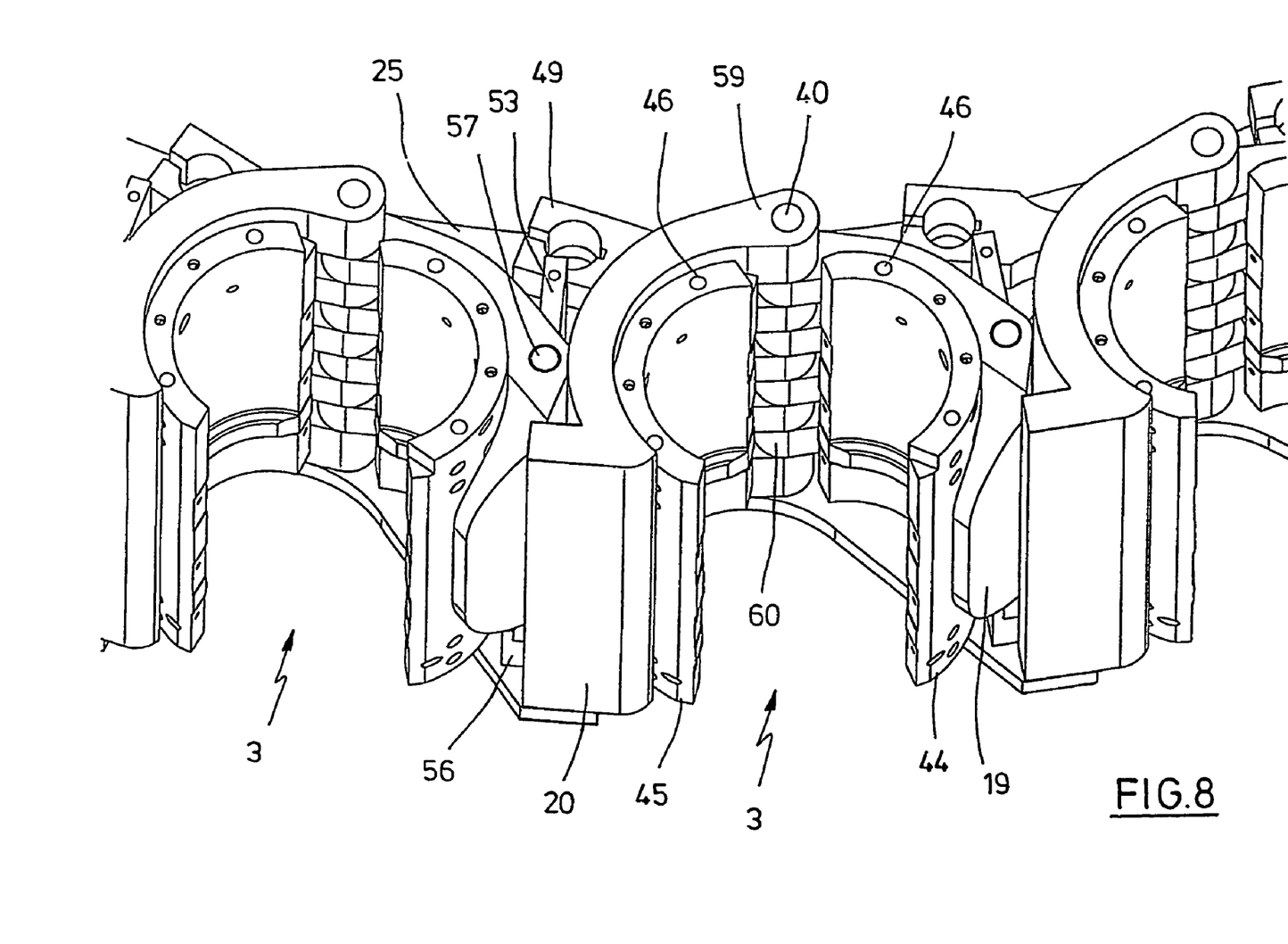
FIG. 8 shows a perspective side view of the arrangement according to FIG. 5.

FIG. 8 shows a perspective view of the blowing stations 3 in the completely opened position corresponding to the view in FIG. 5. It is especially apparent here that the hinge pin 40 of the blowing station is held by lug-like projections 59 of the stationary mold support 20. The projections are provided with recesses that hold the hinge pin 40 in the manner of a bearing. The projections 59 of the stationary mold support 20 mesh and align with projections 60 of the moving mold support 19, which also have recesses for supporting them on the hinge pin 40.

Figure 9:
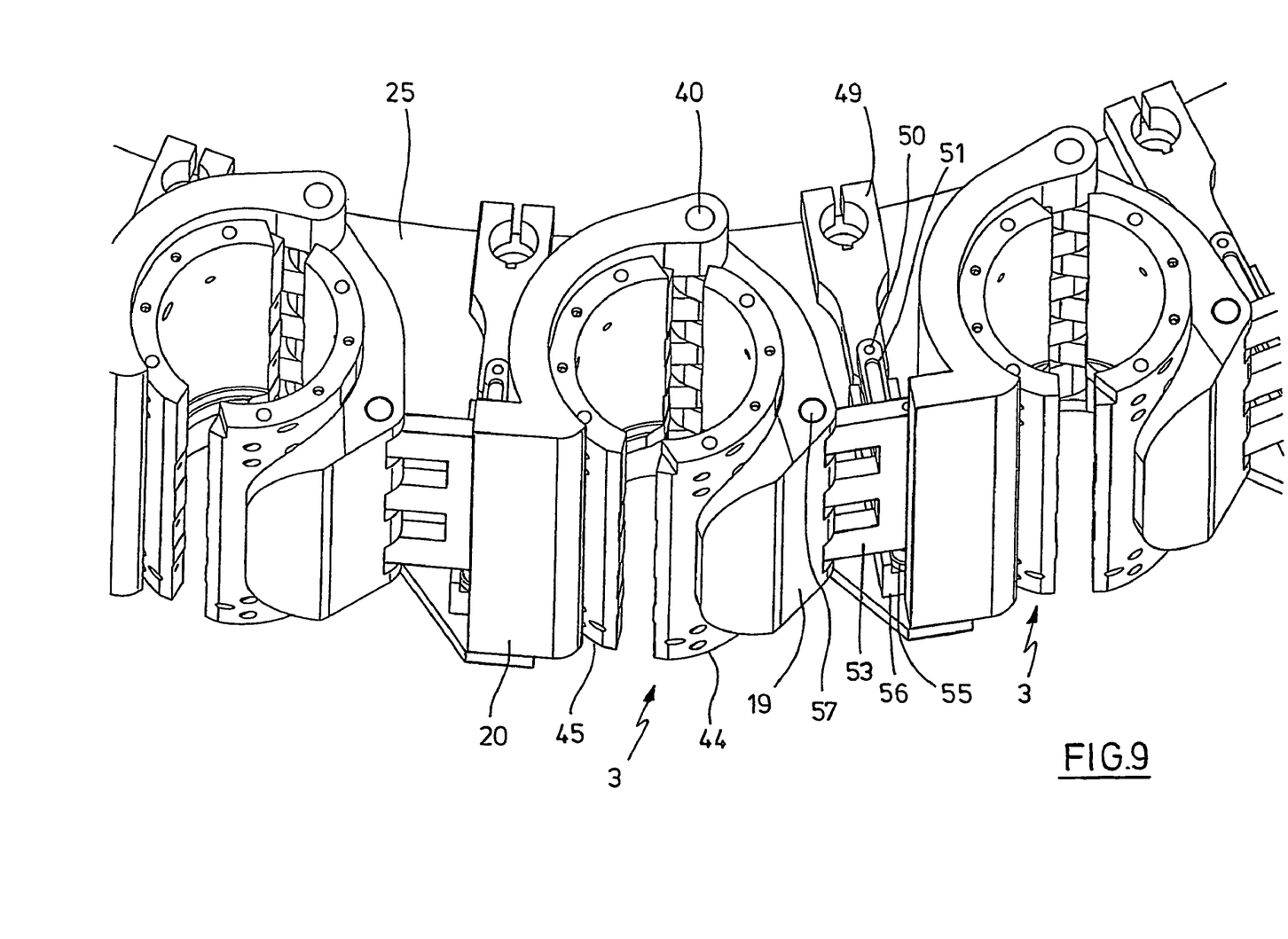
FIG. 9 shows a perspective side view of the arrangement according to FIG. 7.

FIG. 9 shows the same perspective view of the blowing stations 3 as FIG. 8, but here the blowing stations 3 are in the closed position shown in FIG. 7. FIG. 9 again shows especially the alignment of the levers 49, 51, 53 in the closed position of the blowing station 3 and the oblique arrangement of the blowing stations 3 with their parting planes 41 at an angle of inclination relative to the radial direction of the blowing wheel 25.

A pressure zone is located in the vicinity of at least one of the mold supports 20, 19 and one of the outer mold shells 44, 45 to allow bracing of blow mold segments. In particular, it is proposed that the pressure zone be positioned in the vicinity of a side of the outer mold shells 44, 45 that faces away from the mold supports 19, 20. Specifically, it is found to be advantageous with respect to the required connecting lines to position the pressure zone in the vicinity of the stationary mold support 20 and the stationary outer mold shell 45. The pressure zone can be bounded by an elastomeric seal. Typically, compressed air is admitted into the pressure zone to produce the necessary bracing of the blow mold segments, and the bracing is at least as great as the forces which are generated by the introduction of blowing pressure and which can cause undesired partial opening of the blowing station 3 during the blow-molding operation.

Figure 10:
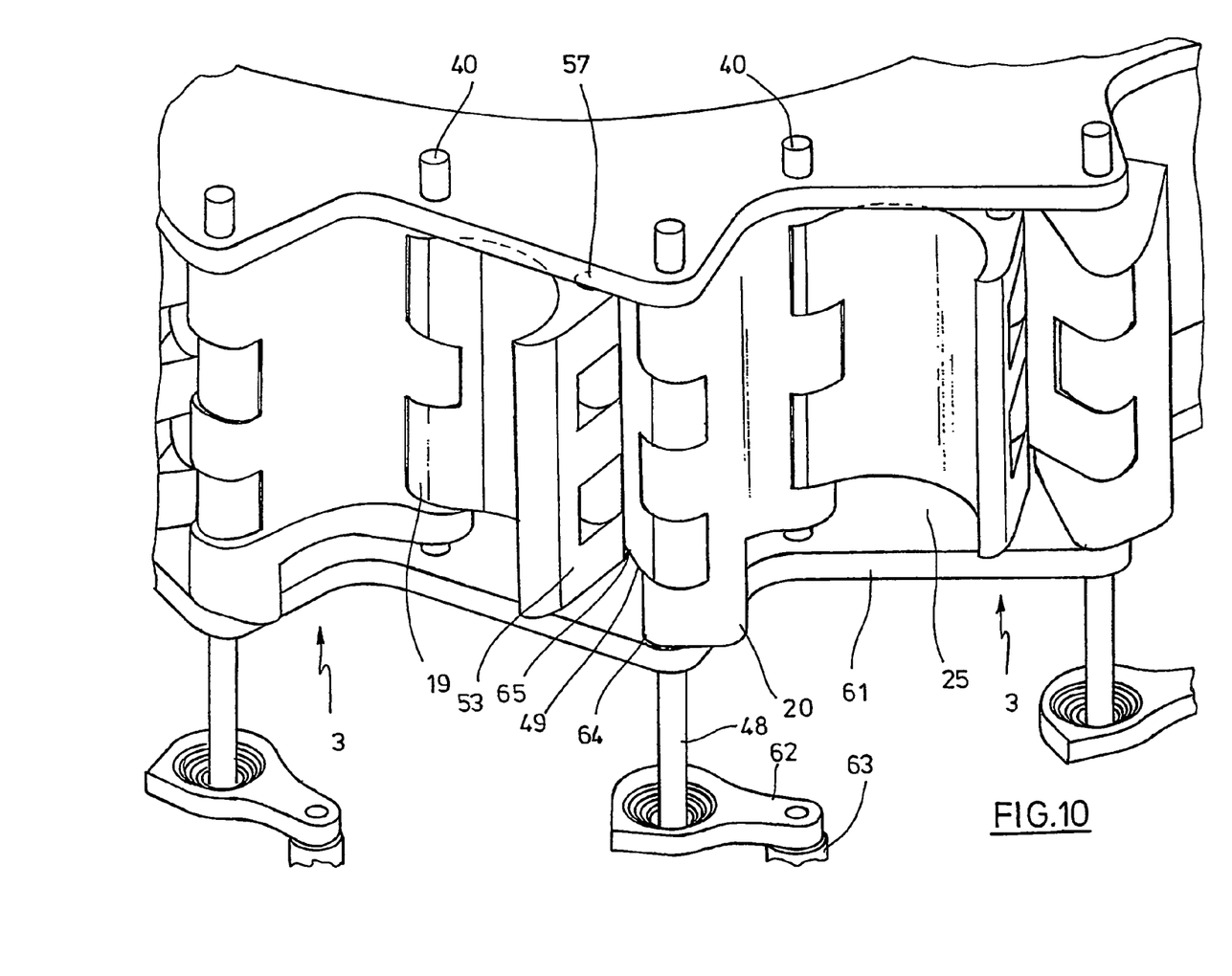
FIG. 10 shows a perspective side view of another embodiment, in which a rotating mold support is connected with both a stationary mold support of its own blowing station and a stationary mold support of an adjacent blowing station.

The embodiment shown in FIG. 10 is a design variant in which the control shaft 48 is mounted near the outer periphery 61 of the blowing wheel 25. The control shaft 48 is connected by a positioning lever 62 with a control roller 63 in such a way that as the control roller 63 is moved along a curved track, positioning movements of the control roller 63 are transformed by the positioning lever 62 into rotational movements of the control shaft 48. In the embodiment according to FIG. 11, the control shaft 48 is supported in the stationary mold support 20. To this end, the mold support 20 has projections 64 that provide bearing bores for the control shaft 48. The projections 64 mesh and align with projections 65 of the articulated link 49, which are rigidly connected with the control shaft 48. A rotational movement of the control shaft 48 is converted in this way to a swiveling movement of the articulated link 49. The articulated link 49 is connected by a support lever 53 with the swivel joint 57 of the movable mold support 19.

Figure 11:
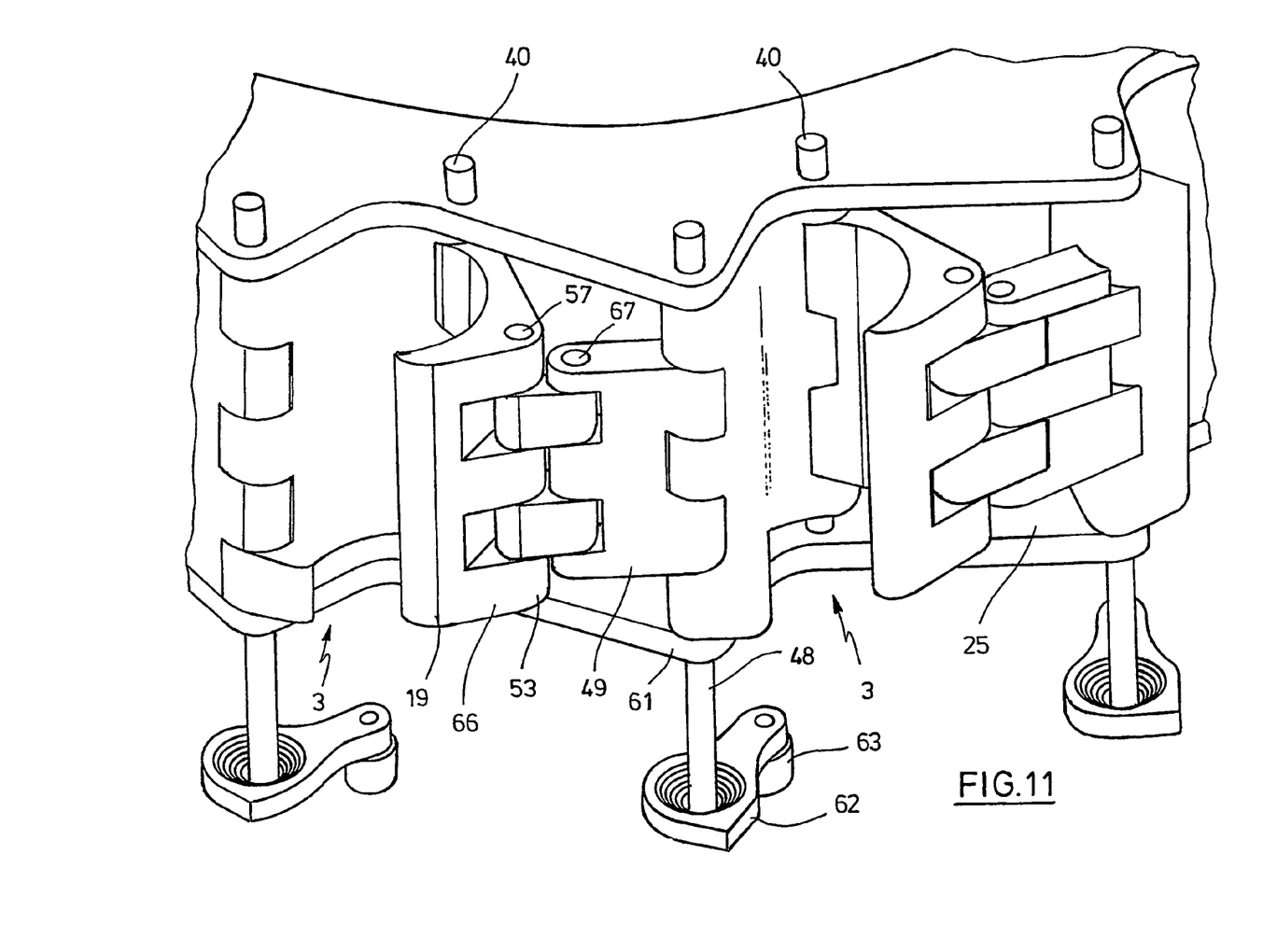
FIG. 11 shows a view of the arrangement according to FIG. 10 after the blowing station has been partially closed.

The arrangement of the articulated link 49 and the support lever 53 is seen in greater detail in the view according to FIG. 11, which shows a partially closed position of the blowing station 3. In the position shown here, the movable mold support 19 has already rotated so far about the hinge pin 40 that the blowing station 3 has almost reached its closed position. The support lever 53 engages between projections 66 of the movable mold support 19, which hold the shaft-like swivel joint 57.

In a completely closed position of the blowing station 3 of FIG. 10 and FIG. 11, the swivel joint 57, a swivel joint 67 that connects the support lever 53 with the articulated link 49, and the control shaft 48 are arranged along a common straight connecting line, so that when internal pressure is applied to the blowing station 3, support is ensured without the introduction of torques into the control shaft 48.

Compared to the previously described embodiments, the embodiment according to FIG. 10 and FIG. 11 has the advantage that the mechanical design is simplified. However, this advantage has the side effect that there is stronger displacement of the resulting masses in the direction of the outer periphery 61 of the blowing wheel 25, which produces higher moments of inertia during acceleration and braking. Therefore, the actual design is selected as a function of an intended speed of revolution of the blowing wheel 25 and a diameter of the blowing wheel 25, which depends on the number of blowing stations 3 to be installed.

All of the embodiments explained above can be used for blow molding the preforms into containers 2 with their mouth sections oriented vertically upward or with their mouth sections oriented vertically downward. The variants of the invention that have been explained above can likewise be combined with all of the illustrated heating systems for the preforms 1.

In accordance with a modification of the embodiment in FIG. 10 and FIG. 11, the control shaft 48 is mounted a greater distance from the outer periphery 61 of the blowing wheel 25, for example, at half the distance between the hinge pin 40 and the position of the control shaft 48 that is shown in FIG. 10 and FIG. 11. This results in the mold supports 19, 20 being supported in a central region of their radial extent. This variant results in a more favorable weight distribution on the blowing wheel 25.

The invention claimed:

1. A device for blow molding containers, which has a heating line for heating injection molded preforms made of a thermoplastic material and a blowing system, which has at least one blowing station arranged on a blowing wheel for shaping the preforms into containers, the blowing station is provided with mold supports for supporting each blow mold segment, and in which blowing system, a first mold support is mounted in such a way that it can move relative to a second mold support by rotating about a hinge pin, wherein, when the blowing station (3) is in a closed position, at least one of the mold supports (19, 20), independently of the other mold support (19, 20) and at a distance from a hinge pin (40) of the blowing station (3), is arranged in such a way that it is supported relative to an end support (58) that is rigidly connected with the blowing wheel (25), and that the mold support (19, 20) that is supported relative to the end support (58) that is positioned in such a way that it can be braced at least temporarily both relative to the end support (58) and relative to the other mold support (19, 20), wherein the blowing station (3) is arranged in such a way with a parting plane (41) of the blow mold segments that the parting plane (41) is positioned obliquely to a radial reference plane (42) of the blowing wheel (25), wherein the radial reference plane extends radially from and axially along the axis of the blowing wheel, and wherein the hinge pin (40) is arranged essentially vertically, wherein the injection molded preforms are transported along a transport path from the heating line to the blowing system.

2. A device for blow molding containers, which has a heating line for heating injection molded preforms made of a thermoplastic material and a blowing system, which has at least one blowing station arranged on a blowing wheel for shaping the preforms into containers, the blowing station is provided with mold supports for supporting each blow mold segment, and in which blowing system, a first mold support is mounted in such a way that it can move relative to a second mold support by rotating about a hinge pin, wherein the second mold support (20) is rigidly connected with the blowing wheel (25), wherein the blowing station (3) is arranged in such a way with a parting plane (41) of the blow mold segments that the parting plane (41) is positioned obliquely to a radial reference plane (42) of the blowing wheel (25), wherein the radial reference plane extends radially from and axially along the axis of the blowing wheel, and wherein the hinge pin (40) is arranged essentially vertically, wherein the injection mold preforms are transported along a transport path from the heating line to blowing system.

3. A device in accordance with claim 1, wherein the mold support (20) that is rigidly connected with the blowing wheel (25) is arranged obliquely to the radial reference plane (42).

4. A device in accordance with claim 1, wherein an angle of inclination (43) between the parting plane (41) and the radial reference plane (42) has a value in the range of 0° to 45°.

5. A device in accordance with claim 1, wherein a supporting device for supporting the movable mold support (19) relative to the end support (58) is designed as part of a toggle joint.

6. A device in accordance with claim 1, wherein a supporting device for supporting the movable mold support (19) relative to the end support (58) has a wedge-shaped design.

7. A device in accordance with claim 1, wherein the end support (58) is designed as an independent part.

8. A device in accordance with claim 1, wherein the end support (58) is designed as part of a blowing station (3) adjacent to the blowing station (3) to be supported.

9. A device in accordance with claim 1, wherein the blowing station (3) is designed for holding preforms (1) with their mouth sections (21) oriented vertically upward.

10. A device in accordance with claim 1, wherein the blowing station (3) is designed for holding preforms (1) with their mouth sections (21) oriented vertically downward.

11. A device in accordance with claim 1, wherein mold supports (20) that are rigidly connected with the blowing wheel (25) and mold supports (19) that can move relative to the blowing wheel (25) are alternately positioned along the outer periphery (61) of the blowing wheel (25).

12. A device in accordance with claim 1, wherein pairs of mold supports (20) that are rigidly connected with the blowing wheel (25) in adjacent blowing stations (3) and pairs of mold supports (19) that are supported in such a way that they can rotate relative to the blowing wheel (25) in adjacent blowing stations (3) are arranged along the outer periphery (61) of the blowing wheel (25).

13. A device in accordance with claim 12, wherein at least two adjacent blowing stations have a common mold support (20) that is rigidly connected with the blowing wheel (25).

* * * * *